UNITED STATES PATENT OFFICE.

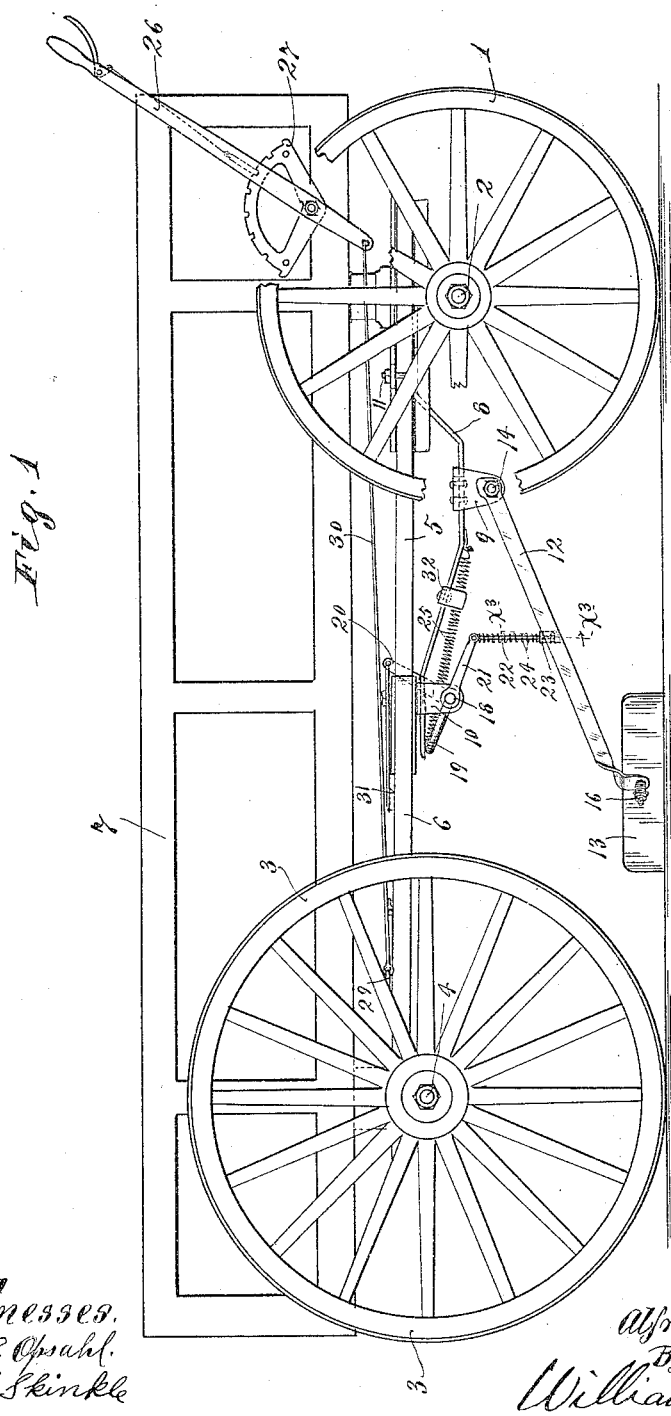

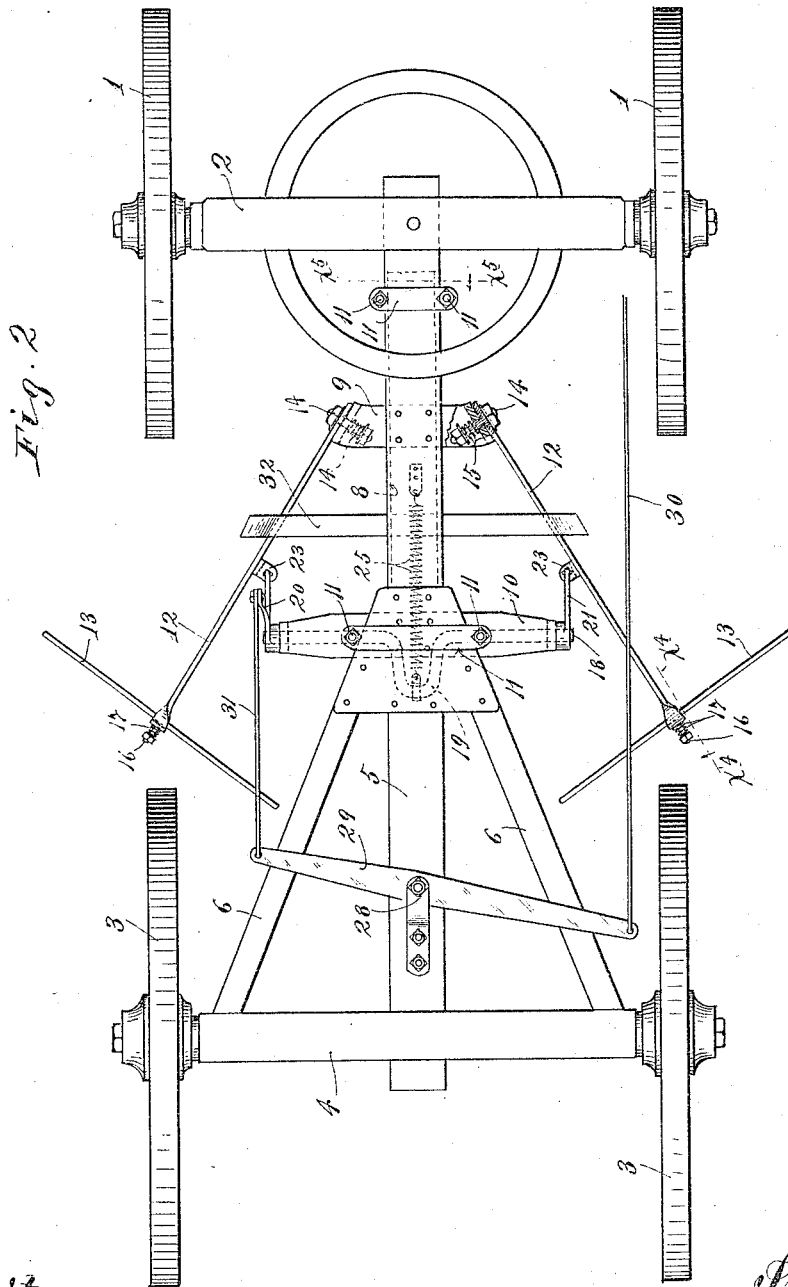

ALFRED AMUNDSON, OF CANBY, MINNESOTA.

ROAD-GRADER ATTACHMENT FOR WAGONS.

1,138,172.   Specification of Letters Patent.   Patented May 4, 1915.

Application filed June 4, 1914. Serial No. 842,879.

*To all whom it may concern:*

Be it known that I, ALFRED AMUNDSON, a citizen of the United States, residing at Canby, in the county of Yellow Medicine and State of Minnesota, have invented certain new and useful Improvements in Road-Grader Attachments for Wagons; and I do hereby declare the following to be a full, clear, and exact description of the invention, such as will enable others skilled in the art to which it appertains to make and use the same.

My invention has for its object to provide a road grader attachment for wagons, especially adapted as an attachment for wagons generally designated as farm wagons; and, to this end, the invention consists of the novel devices and combinations of devices hereinafter described and defined in the claims.

In the accompanying drawings, which illustrate the invention, like characters indicate like parts throughout the several views.

Referring to the drawings, Figure 1 is a side elevation of a farm wagon, having applied thereto in working position, the improved road grader attachment; Fig. 2 is a plan view of the same, with the wagon box removed and some parts broken away; Fig. 3 is a detail view, partly in elevation and partly in transverse vertical section, taken on the line $x^3$—$x^3$ of Fig. 1, on an enlarged scale; Fig. 4 is a detail view, partly in elevation and partly in vertical section, taken on the line $x^4$—$x^4$ of Fig. 2, on an enlarged scale; and Fig. 5 is a detail view, in transverse section, taken on the line $x^5$—$x^5$ of Fig. 2, on an enlarged scale.

Of the parts of the farm wagon, it is only necessary to note, front wheels 1, front axle 2, rear wheels 3, rear axle 4, reach 5, hind hounds 6, and wagon box 7.

Located under the reach 5, and extending longitudinally thereof, is a hanger bar 8, having front and rear pairs of laterally and downwardly projecting arms 9 and 10, respectively, the purpose of which will presently appear. The hanger bar 8 is detachably and removably secured to the reach 5 by a pair of clamping plates and coöperating draw bolts 11. These clamping plates rest one on the reach 5 and the other on the forward ends of the hounds 6. The front pair of draw bolts extends through the coöperating clamping plate on opposite sides of the reach 5 and through the forward end portion of the hanger bar 8. The rear pair of these draw bolts extends through the coöperating clamping plate on opposite edges of the hounds 6 and through the arms 10. Obviously, by adjusting the draw bolts, the clamping plates and end portions of the hanger bar 8 may be frictionally clamped in position on the running gear of the wagon.

To the arms 9 is pivotally secured the forward ends of a pair of rearwardly diverging drag bars 12, and, to the rear ends of said bars is secured a pair of scraper blades 13. The pivotal connections between the drag bars 12 and arms 9 are in the form of nut-equipped bolts 14, of a length sufficient to permit lateral movements of said bars in respect to said arms. These connections also permit free raising and lowering movements of the rear ends of the drag bars 12 to which the scraper blades 13 are attached. Coiled springs 15 are mounted on the pivot bolts 14, compressed between the inner ends thereof and the arms 9, and tend to hold the drag bars 12 against lateral movement with respect to the said arms. The connections between the drag bars 12 and scraper blades 13 are in the form of headed studs 16, passed through perforations in the rear downturned ends of said drag bars and rigidly secured to the intermediate portions of the scraper blades 13, and extend horizontally and rearwardly therefrom. These headed studs 16 are of a length to permit lateral separations of the scraper blades 13 with respect to the drag bars 12. Mounted on the studs 16 and compressed between the heads thereof and the drag bars 12, are coiled springs 17, which tend to hold the scraper blades in flat contact with the bars 12. Obviously, the springs 15 and 17 will yield to permit lateral movements of the drag bars 12 and scraper blades 13 in case said scraper blades strike an obstruction, thus avoiding straining or breaking of the parts of the attachment.

As best shown in Fig. 2, the scraper blades 13 are set oblique, in respect to the direction of travel of the wagon, extend between the front and rear wheels and about one foot on each side thereof, and are arranged to scrape the dirt and loose stones into the center of the road bed.

The scraper blades 13 are raised and lowered by a rock shaft 18, having a central crank 19. This shaft 18 extends transversely of the wagon and is journaled in the outer end portions of the arms 10. To one end of the shaft 18 is rigidly secured a bell crank 20 and to the other end thereof is rigidly secured an arm 21, which extends parallel with and in the same plane of the lower arm of the bell crank 20. Pivotally secured to the free ends of the lower arm of the bell crank 20 and the arm 21 is a pair of depending eye-bolts 22, having nut-equipped lower ends. The intermediate portions of these eye-bolts work through perforated brackets 23, rigidly secured to the intermediate portions of the drag bars 12. Coiled springs 24 are mounted on the eye-bolts 22 and compressed between the arms, to which said eye bolts are pivotally connected, and the brackets 23. These springs 24 yieldingly press the rear ends of the drag bars 12 downward to hold the scraper blades 13 in engagement with the road bed. In case the scraper blades strike an obstruction in the road, the springs 24 will yield to permit said scraper blades to rise and pass over the obstruction, thus avoiding straining or breaking of the parts of the attachment.

A long coiled spring 25 is anchored at its ends to the hanger bar 8, just rearward of the arms 9, and to the crank 19. This spring is considerably heavier than the springs 24 and is provided for holding the crank 19 on either side of a dead center. Obviously, the spring 25 will assist in raising the scraper blades 13 after the crank 19 is passed a dead center during the upward movement of said scraper blades and it will also assist in holding the said scraper blades in engagement with the road bed during the scraping thereof.

The rock shaft 18 is oscillated, to raise and lower the scraper blades 13, by a latch lever 26, intermediately fulcrumed to a coöperating segment 27, secured to the wagon box 7. This latch lever 26 is connected to the upper arm of the bell crank 20 by the following connections: Intermediately fulcrumed to the reach 5, just forward of the rear axle 4, by a hammer strap and coöperating pin 28, is a horizontally extended lever 29, which extends transversely of the reach 5. The long end of this lever 29 is connected to the lower or short end of the latch lever 26 by a long rod 30, and the short end of the lever 29 is connected to the upper arm of the bell crank 20 by a relatively short rod 31.

Rigidly secured to the hanger bar 8, and extending transversely thereof, is a stop bar 32, which limits the upward swinging movement of the drag bars 12.

From the foregoing description, it is evident that the improved attachment may be readily applied to or removed from a wagon. The arrangement of the scraper blades 13 is such that the dirt will be scraped into the ruts formed in the road bed by the wagon wheels, thus leveling the road bed and scraping the surplus dirt to the center of said road bed.

What I claim is:

1. The combination with a wagon having front and rear pairs of wheels, and a reach structure connecting said front wheels to said rear wheels with freedom for horizontal swinging movement, of a hanger bar detachably secured to said reach structure, a pair of rearwardly diverging drag bars pivotally connected at their forward ends to said hanger bar, with freedom for raising and lowering movements and for limited lateral swinging movements, springs tending to hold drag bars against lateral movements, a pair of scraper blades, secured to said drag bars, extending transversely of said rear wheels and in front thereof, and means for raising and lowering said drag bars.

2. The combination with a wagon, of a grader attachment for said wagon, comprising a drag bar, pivotally connected at its forward end to the running gear of said wagon, with freedom for raising and lowering movements, and for a limited lateral movement, a spring tending to hold said drag bar against lateral movement, a scraper blade attached to the rear end of said drag bar, and means for raising and lowering said scraper blade.

In testimony whereof I affix my signature in presence of two witnesses.

ALFRED AMUNDSON.

Witnesses:
 JOHN P. HENTGES,
 P. H. LEVERSON.

Copies of this patent may be obtained for five cents each, by addressing the "Commissioner of Patents, Washington, D. C."